United States Patent [19]
Rohleder et al.

[11] Patent Number: 5,429,696
[45] Date of Patent: * Jul. 4, 1995

[54] PROCESS FOR PRODUCING A MULTILAYERED FILM COMPOSITE FROM THERMOPLASTIC, COEXTRUDED PLASTIC FILM WEBS

[75] Inventors: Sabine Rohleder, Weiterstadt; Jochen Coutandin, Langenlonsheim, both of Germany

[73] Assignee: Hoechst Aktiengesellschaft, Frankfurt am Main, Germany

[*] Notice: The portion of the term of this patent subsequent to Feb. 1, 2011 has been disclaimed.

[21] Appl. No.: 241,452

[22] Filed: May 11, 1994

Related U.S. Application Data

[63] Continuation of Ser. No. 43,606, Apr. 5, 1993, abandoned, which is a continuation of Ser. No. 790,514, Nov. 12, 1991, abandoned.

[30] Foreign Application Priority Data

Nov. 12, 1990 [DE] Germany ............ 40 35 873.9

[51] Int. Cl.⁶ .............. B32B 31/04; B32B 31/08; B32B 31/20; B32B 31/22
[52] U.S. Cl. .................. 156/220; 156/182; 156/229; 156/309.6; 156/309.9; 156/311; 156/308.2; 156/322; 156/324
[58] Field of Search ............ 156/182, 220, 229, 309.6, 156/309.9, 324, 311, 308.2

[56] References Cited

U.S. PATENT DOCUMENTS

| | | | |
|---|---|---|---|
| Re. 27,992 | 3/1959 | Doherty et al. | 156/209 |
| 2,733,180 | 1/1956 | Pinto | 156/209 |
| 3,196,062 | 7/1965 | Kristal | 156/209 |
| 3,249,482 | 5/1966 | Gilfillan | 156/182 |
| 3,262,829 | 7/1966 | Conti | 156/182 |
| 3,360,412 | 12/1967 | James | 156/309.9 X |
| 3,540,966 | 11/1970 | Baker et al. | 156/182 |
| 3,560,322 | 2/1971 | Magid | 156/209 X |
| 3,948,709 | 4/1976 | Ida et al. | 156/209 |
| 4,022,643 | 5/1977 | Clark | 156/209 |
| 4,135,962 | 1/1979 | Sinclair et al. | 156/209 |
| 4,198,256 | 4/1980 | Andrews et al. | 156/182 X |
| 4,589,942 | 5/1986 | Korinek | 156/182 |
| 4,677,017 | 6/1987 | DeAntonis et al. | 156/244.11 X |
| 4,778,557 | 10/1988 | Schirmer | 156/272.6 X |
| 4,861,409 | 8/1989 | Hashida et al. | 156/182 |
| 4,915,763 | 4/1990 | Swiszcz | 156/209 |
| 5,091,032 | 2/1992 | Schulz | 156/209 |
| 5,283,017 | 2/1994 | Rohleder et al. | 156/324 |
| 5,328,536 | 7/1994 | Rohleder et al. | 156/229 |

FOREIGN PATENT DOCUMENTS

| | | |
|---|---|---|
| 527905 | 11/1979 | Australia . |
| 0212232 | 3/1987 | European Pat. Off. . |
| 0233585 | 8/1987 | European Pat. Off. ......... 156/309.9 |
| 0207047 | 1/1990 | European Pat. Off. . |
| 0363794 | 4/1990 | European Pat. Off. . |
| 1441508 | 5/1966 | France . |
| 2167876 | 8/1973 | France . |
| 3020008 | 12/1981 | Germany . |
| 3840704 | 7/1989 | Germany . |
| 3530309 | 12/1989 | Germany . |
| 1220080 | 12/1967 | United Kingdom . |
| 2127344 | 4/1984 | United Kingdom . |

OTHER PUBLICATIONS

Patent Abstracts of Japan, vol. 10, No. 281, (M-520) [2337], Sep. 25, 1986, and JP-A-61-102235, May 20, 1986.

Primary Examiner—David A. Simmons
Assistant Examiner—M. Curtis Mayes
Attorney, Agent, or Firm—Foley & Lardner

[57] ABSTRACT

A temperature-controllable roller 1 is used as the sealing tool, on whose circumferential surface a plurality of plastic film webs are sealed together under the action of heat and pressure. The plastic film webs, which are conveyed about compression rolls, run at equal or different mutual distances onto the circumferential surface of the temperature-controllable roller. These compression rolls rest against the circumferential surface of the temperature-controllable roller and exert pressure onto the latter. The webs of plastic film run through the contact nips between the compression rolls and the temperature-controllable roller. The plastic film webs are provided on one or both sides with sealing layers, which are incipiently melted by the action of heat, so that a sealing of the plastic film webs in layers one on top of the other occurs on the circumferential surface of the temperature-controllable roller.

10 Claims, 3 Drawing Sheets

PROCESS FOR PRODUCING A MULTILAYERED FILM COMPOSITE FROM THERMOPLASTIC, COEXTRUDED PLASTIC FILM WEBS

This application is a continuation of application Ser. No. 08/043,606, filed Apr. 5, 1993, now abandoned which is a continuation of application Ser. No. 07/790,514, filed Nov. 12, 1991 now abandoned.

BACKGROUND OF THE INVENTION

The invention relates to an apparatus for producing a multilayered film composite comprising sealed-together plastic films, said apparatus having a number of supply rolls, on which the plastic films in web form are wound, as well as to a process for producing a multilayered film composite from biaxially stretched and/or monoaxially stretched and/or unstretched thermoplastic, coextruded plastic films, which are provided on at least one side with a sealing layer, by sealing-the films under pressure and heat application.

On the part of various industries, such as for example apparatus engineering, vehicle and aircraft engineering, or safety technology, there is an increasingly great interest in high-strength film composites and composite bodies in the form of webs and semi-finished products, such as for example sheets, as well as finished components. Following this trend, sheet producers are working on techniques for the production of products which can be subjected to higher mechanical loads. At the same time as modification of the polymer materials intended for sheet production by the incorporation of reinforcing materials, such as for example textile, glass, or carbon fibers, techniques for the production of intrinsically reinforced sheets by orienting measures are being developed. Examples of solutions covered by these techniques are roll press stretching or the process described in EP-A 0 207 047, the essential measure in the process Being that of compressing a plurality of biaxially stretched films, provided with thin, coextruded sealing layers, into a homogeneous sheet of any thickness, with application of pressure and heat. For this purpose, in general the stack of films laid between two pressing plates is introduced into discontinuously operating, hydraulic plate presses of single or tier design. The pressing operation is determined by process parameters, such as pressure, temperature, and time. The last of these process parameters in particular stands in the way of inexpensive production of composite laminates, in particular in the case of heating through very thick panels. Continuous run-through presses, in particular twin-belt presses, represent a practicable, time-saving solution in this respect, but can only be used to a limited extent in view of the speeds which can be achieved on them.

German Patent 35 30 309 describes a process and an apparatus for continuously producing thermoplastic webs, in particular for further processing into panels or films, from at least one extruded thermoplastic web heated to processing temperature, which in the heated state is cooled between two fixedly arranged pressure plates, so that the surface of the thermoplastic web is calibrated and smoothed. The cooling of the thermoplastic web is performed under the action of surface pressure, for which purpose it is guided during cooling between two continuously moving, endlessly circulating pressing belts. At the same time, a uniform surface pressure is exerted from the pressure plates hydraulically or mechanically on the inner sides of the moving pressing belts and is transferred from these to the thermoplastic web. The pressure plates are kept at a lower temperature than the final temperature of the thermoplastic web, in order in this way to maintain a temperature gradient between thermoplastic web, pressing belt, and pressure plate. The cooling of the thermoplastic web takes place by heat from the web being dissipated via the pressing belt to the pressure plates by means of heat conduction. The surface pressure acts throughout the entire duration of the cooling of the thermoplastic web between the pressing belts.

SUMMARY OF THE INVENTION

One object of the invention is to improve an apparatus of the type described at the beginning in such a way as to permit a continuous, cost-saving production of a web of composite film of given thickness to a high rate from heat-sealable plastic films with improved mechanical properties in comparison with extruded films of the same thickness as the film composite and at least unchanged optical properties of the film composite from those of the individual plastic film.

In accordance with one aspect of the invention, an apparatus for producing a multilayered film composite (comprised of sealed-together plastic films), comprises a plurality of supply rolls, each for supplying a plastic film web; a heatable roller constituting a sealing tool on whose circumferential surface the plastic film webs are sealed together; a plurality of heated compression rolls arranged adjacent to the circumferential surface of the heatable roller at a distance from one another; wherein the plastic film webs are passed over the compression rolls and through contact nips between the compression rolls and the heatable roller, the plastic film webs running over the surface of the heatable roller at mutual distances being sealed by applying, via the compression rolls, heat and pressure to the plastic film web transported in the superimposed state; and at least one of a cooling, embossing, and pressing device adjoining the heatable roller.

In accordance with another aspect of the invention, a process for producing a multilayered film composite from thermoplastic, coextruded plastic film webs, which are provided on at least one side with a sealing layer, by sealing under pressure and heat application, comprises the steps of: building up the film composite by continuous, additive sealing of individual moving plastic film webs onto a moving first plastic film web up to a given final thickness, the plastic film webs being fed separately and at a distance from one another to a heatable, curved surface and guided along this surface, and exerting pressure on each of the plastic film webs directly at its point of entry onto the curved surface.

In accordance with yet another aspect of the invention, a process for producing a multilayered thick film from multilayered film composites, comprises the steps of: producing a plurality of multilayered film composites from thermoplastic, coextruded plastic film webs, which are provided on at least one side with a sealing layer, by sealing under pressure and heat application, each multilayered film composite being produced by a process comprising the steps of: building up the film composite by continuous, additive sealing of individual moving plastic film webs onto a moving first plastic film web up to a given final thickness, the plastic film webs being fed separately and at a distance from one another to a heatable, curved surface and guided along this surface, and exerting pressure on each of the plastic film webs directly at its point of entry onto the curved surface; building up the multilayered thick film by continuous, additive sealing of individual moving thick film composites onto a moving first thick film composite up to a given final thickness, the thick film composites being fed separately and at a distance from one another to a heatable, curved surface and guided along this surface; and exerting pressure on each of the thick film composites directly at its point of entry onto the curved surface for sealing the thick film composites together.

By an apparatus according to the present invention the foregoing object is achieved in that a heatable roller constitutes a sealing tool on whose circumferential surface plastic film webs are sealed together, that heated compression rolls are adjacent to the circumferential surface of the heatable roller at equal or different distances from one another, that the webs of plastic film are passed over the compression rolls and through the contact surfaces between the compression rolls and the heated roller, and that the webs of plastic films running over the surface of the roller at mutual distances are sealed by applying, via the compression rolls, heat and/or pressure to the webs of plastic film transported in the super-imposed state, and that the heatable roller is adjoined by at least one cooling, embossing and/or pressing device.

The process for producing a multilayered film composite from biaxially stretched and/or monoaxially stretched and/or unstretched thermoplastic, coextruded plastic films, which are provided on at least one side with a sealing layer, by sealing under pressure and heat application, is distinguished by the fact that the film composite is built up by the continuous, additive sealing of individual, moving plastic film webs onto a moving first plastic film web up to a given final thickness, the plastic film webs being fed separately and at a distance from one another to a heated, curved surface and guided along this surface, and that pressure is exerted on each of the plastic film webs directly at its point of entry onto the curved surface. The thickness build-up of a film composite in web form by continuous, additive laminating of individual plastic film webs one on top of the other is achieved by the heat sealing layers of the plastic film webs being briefly melted directly before the webs are brought together and compressed by means of linear pressure. In comparison with the time-consuming, conventional compressing of a compact stack of films in plate presses or the initiating of the thermal film shrinkage necessary for homogeneous bonding in the case of pipe production, the invention offers the advantages that the heating and incipient melting operation of the just a few $\mu m$ thick sealing layers of the plastic film webs can be carried out in an extremely short time and consequently also substantially avoiding thermal damage to the plastic material, that with the continuous process relatively high speeds can be achieved and that the film composite is produced as a wound roll, which can be further processed without any problems. In contrast to the pressing of a compact stack of films, in which each film ply has a different temperature profile, the compressing according to the invention takes place under always constant, benign conditions for each of the individual plastic film webs. In comparison with the compressing of a stack of films by means of a twin-belt press, lower investment costs, a higher processing speed and a simplification of the possibilities of variation for texturing, calibrating, and further processing the surfaces of the film composite result.

BRIEF DESCRIPTION OF THE DRAWINGS

The invention is explained in more detail below with reference to the drawings, which are incorporated in and constitute a part of the specification and in which.

DETAILED DESCRIPTION OF THE PREFERRED EMBODIMENTS

Figure 1:
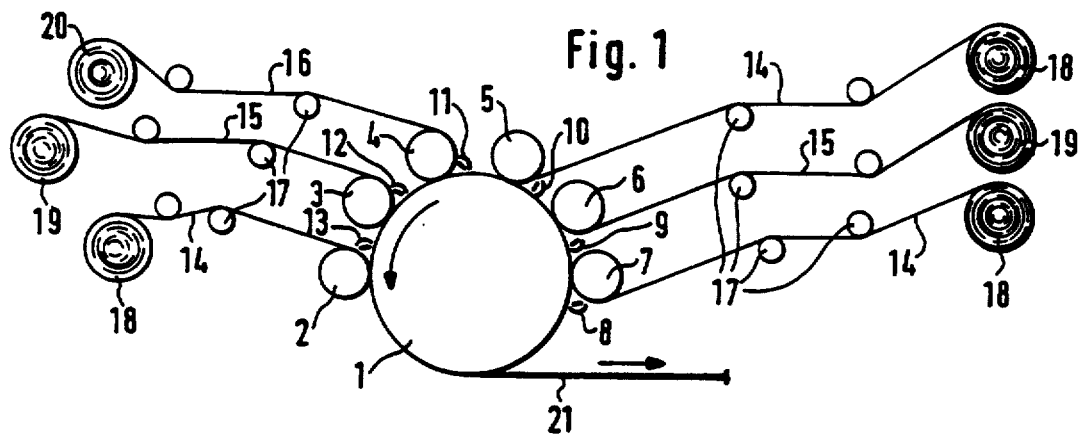
FIG. 1 shows a diagrammatic view of a first embodiment of the apparatus according to the invention.

In FIG. 1 a diagrammatic sectional view of a first embodiment of the apparatus according to the invention for producing a multilayered film composite 21 is shown.

A heatable roller 1, which in general is a large-diameter driven steel roller with a highly polished or matte circumferential surface, represents a sealing tool for a number of webs of plastic film which are sealed together.

These plastic film webs, which are wound up on supply rolls 18, 19, 20 are, for example, biaxially stretched plastic film web 14, monoaxially stretched plastic film web 15, and unstretched plastic film web 16. Heated compression rolls (or impression rolls; or impression cylinders) 2, 3, 4, 5, 6 and 7 are arranged at equal or different distances from one another along the circumferential surface of heatable roller 1 and rest against the latter under pressure.

For reasons of space, in all the exemplary embodiments of the apparatus according to the invention represented in FIGS. 1 to 7, no more than six such plastic film webs are shown, but it is possible to seal together up to twenty individual plastic film webs. The number of compression rolls (of which there are up to twenty in one preferred embodiment) is equal to or greater than the number of plastic film webs.

As FIG. 1 shows, the individual, biaxially stretched plastic film web 14 is, e.g., wound up on a supply roll 18, whereas each individual monoaxially stretched plastic film web 15 and each unstretched plastics film web 16 are wound up onto a supply roll 19 and 20, respectively. It is self-evident, although not shown in FIG. 1, that all the plastic film webs to be sealed together which form the film composite 21 may be comprised of the same plastic, for example, polypropylene with the same finish, i.e., exclusively biaxially or monoaxially stretched. Of course, films of different starting materials may also be sealed to form a film composite. The only prerequisite is that the individual films can be sealed to one another. The individual plastic film web is fed via guide rolls 17 to the associated compression roll 2, 3, 4, 5, 6, or 7.

These compression rolls are driven, heatable rolls whose diameters are considerably inferior to the diameter of roller 1, which is self-evident in view of their great number of up to 20. The plastic film webs are provided on one or both sides with sealing layers, which are incipiently melted during the sealing operation of the plastic film webs, as will be explained in further detail below.

Compression rolls 2 to 7 may be, for example, impression rolls or impression cylinders, the metal roll bodies of which are covered by temperature-resistant rubber layers and are heated by means of heating systems which are not shown. The individual compression rolls may also be highly polished metal rolls without a rubber covering.

Similarly, guide rolls 17, which are arranged upstream of the individual compression rolls, may be preheated, so that the plastic film webs fed from the supply rolls to the impression rolls are already heated. Compression rolls 2 to 7 can be moved hydraulically, pneumatically, or mechanically by means of a system of levers, so that they can be lifted off from the circumferential surface of roller 1 in order to facilitate the insertion of the individual plastic films into the nip existing between the circumferential surface of roller 1 and individual compression rolls 2 to 7.

The positioning of the compression rolls and the applying of the pressure by which the compression rolls are pressed against the roller 1 and thus exert a corresponding sealing pressure in order to seal the respective plastic film web onto the film composite growing layer by layer may, as already mentioned, take place either hydraulically, pneumatically, or by a lever mechanism. In other words, compression rolls 2 to 7 can be pressed hydraulically, pneumatically, or mechanically against heatable roller 1 to varying degrees in order to exert a variable linear pressure on the individual plastic film web.

Close to the contact surface between roll 1 and the individual compression rolls there is arranged in each case a movable heating device 8, 9, 10, 11, 12 and 13 respectively for selective changing of the mechanical properties of the starting film, for example by shrinking and, if necessary, in addition to the heated rolls, for incipiently melting the sealing layers of the plastic film webs.

Figure 2:
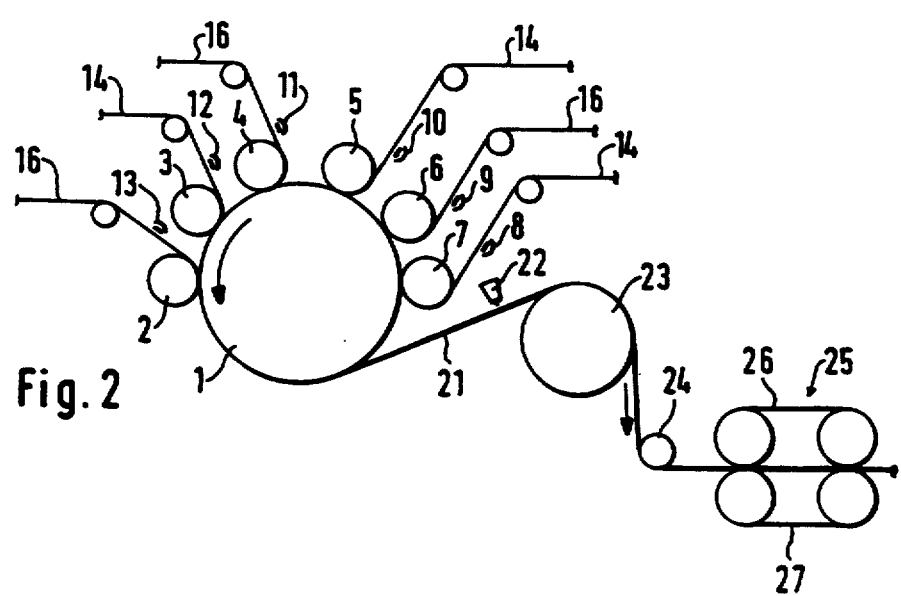
FIG. 2 shows a diagrammatic view of a second embodiment of the apparatus, with a cooling arrangement and a temperature-controllable twin-belt press for the film composite.

This heating device preferably includes infrared radiators which can be moved along a section of the path of the plastic film web. These heating devices may also be air nozzles through which hot air can be blown, and which thus bring about the incipient melting of the sealing layers of the plastic film webs or a shrinkage of the film webs directly before they are brought together in the respective nip. In FIG. 2, heating devices 8 to 13 are shown in positions outside the nips present between roller 1 and compression rolls 2 to 7. The distance of heating devices 8 to 13 from the circumferential surface of heatable roller 1 is adjustable.

The highlighted use of coextruded biaxially or monoaxially stretched plastic film webs provided with sealing layers, for laminating or sealing into a film composite, does not signify a restriction of the invention to these starting materials. A practical alternative to the production of a film composite from coextruded sealable plastic webs is that of sealing layers of monofilms which are absolutely identical in terms of material, are not stretched and differ purely and simply by their degree of orientation and the resultant morphological structure.

Compared with unstretched monofilms, monoaxially or biaxially stretched films have a different morphological structure, which is reflected inter alia by different melting temperatures of the plastic films. This can be utilized to the extent that, in a film composite comprising alternately layered unstretched and stretched plastic film webs, the unstretched plastic film webs already begin to melt under the usual processing conditions and thereby assume the functions of an adhesion promoter with respect to the stretched plastic film webs not yet melting under the pressure and heat conditions of the sealing operation. In other words, this means that, with such an alternating layering of stretched and unstretched plastic film webs, none of the webs has to have sealing layers and they can nevertheless be laminated together. The thickness of the layered film composite 21 lies in the range from 100 $\mu$m up to 600 $\mu$m.

The second embodiment of the apparatus according to the invention, shown in FIG. 2, is of a similar construction to the first embodiment according to FIG. 1 with respect to roller 1, compression rolls 2 to 7, and the feeding of the plastic film webs 14 and 16. For reasons of space, in the case of this embodiment the supply rolls for the plastic film webs are omitted. This apparatus is used, for example, to seal or laminate biaxially stretched plastic film webs 14 alternately with unstretched plastic film webs 16 to form the film composite 21. This embodiment of the apparatus is equipped with additional equipment, such as for example a cooling device comprising a fan or air nozzles 22, from which cooling air is blown onto the upper side of film composite 21, and/or comprising a temperature-controllable cooling roll 23, over which film composite 21 is guided along part of the circumference after leaving roll 1.

After cooling roll 23, a deflecting roll 24 is provided, by which film composite 21 is deflected out of its vertical direction into a horizontal direction, in order to run subsequently through a temperature-controllable twin-belt press 25, which comprises two endlessly circulating pressing belts 26 and 27, which form a common contact surface, through which film composite 21 runs. With the aid of this twin-belt press 25, both the upper side and the underside of film composite 21 can be textured or smoothed in a given way. Twin-belt press can also be used for cooling film composite 21, either alone or in combination with the fan and/or cooling roll. Likewise, cooling can be performed in a cooling bath, which may be used alone or in combination with the cooling devices described above. In other words, after leaving heatable roller 1, film composite 21 runs through a cooling arrangement including a fan 22, and/or temperature-controllable cooling roll 23, and/or temperature-controllable twin-belt press 25, and/or a cooling bath.

Figure 3:
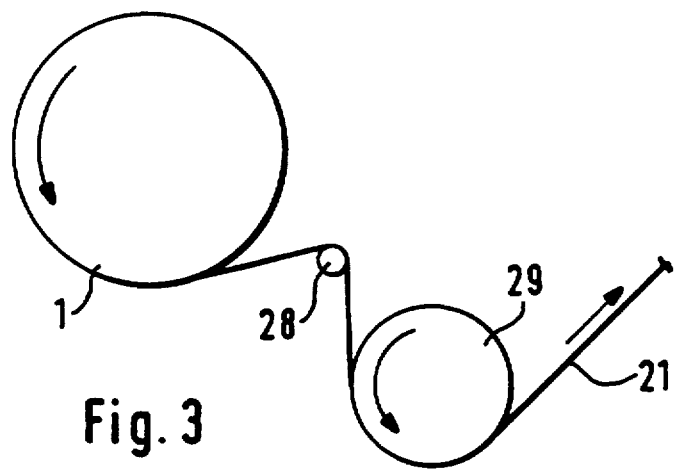
FIG. 3 shows a third embodiment of the apparatus in diagrammatic representation, with a roll arrangement for stretching the film composite.

FIG. 3 shows a third embodiment of the apparatus, which differs from the first and second embodiments in that a roll arrangement comprising a temperature-controllable roll 28 and a driven roll 29, which is also temperature-controllable, the diameter of roll 29 being a multiple of the diameter of roll 28. This roll arrangement is provided to prevent curling of film composite 21 by stretching the latter by exerting a high tensile force to it. The tendency to curling is, for example, caused by the fact that the uppermost plastic film web of the film composite has a greater length than the lowest plastic film web of layered film composite 21, i.e., the web which constitutes the base layer of the film composite. Film composite 21 is drawn over small diameter roll 28, such that the base layer or lowest film web is stretched, the differences in length between the lowest and uppermost plastic film web are compensated and the tendency to curling of film composite 21 is thus eliminated or avoided.

FIGS. 4, 5, 6a, and 6b show various embossing devices for film composite 21, which are installed as additional optional units upstream or downstream of roller 1.

Figure 4:
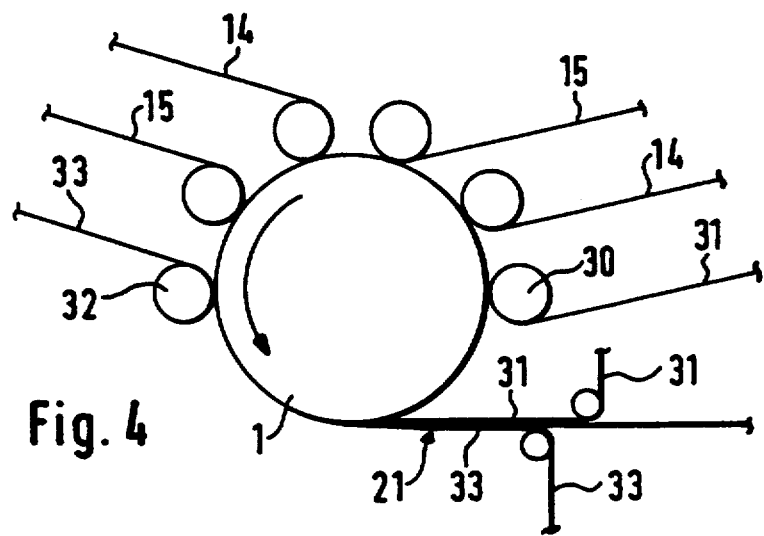
FIG. 4 shows a fourth embodiment of the apparatus in diagrammatic representation, with embossing foils for texturing the surfaces of the film composite.

In the case of the fourth embodiment of the apparatus, shown in FIG. 4, there are two embossing foils 31 and 33, which are guided over part of the circumferences of roller 1. The supply rolls for these embossing foils and for the plastic film webs have been omitted for reasons of better overall clarity. Embossing foil 31 runs from the supply roll (not shown) via a compression roll 30 onto the circumferential surface of roll 1 and serves as a support for film composite 21 to be built up. As the lowest layer of film composite 21, a biaxially stretched plastic film web 14 is, for example, fed to roll 1, and monoaxially and biaxially stretched plastic film webs 15, 14, 15, and so on are alternately stacked on top thereof. The last and uppermost ply of the film composite is embossing foil 33 which is guided about a compression roll 32. When film composite 21 including the two embossing foils 31 and 33 is detached from roll 1, the two embossing films are peeled off from composite film 21 by means of deflecting rolls and are wound onto winding rolls (not shown). Thus in one embodiment, film composite 21 is passed over the circumferential surface of heatable roller 1 between two embossing foils 31, 33 which are arranged at a distance from one another, in the running direction of the film composite; embossing foils 31, 33 provide the underside and upperside of film composite 21 with an embossing and, after detachment from heatable roller 1, are wound up.

Figure 5:
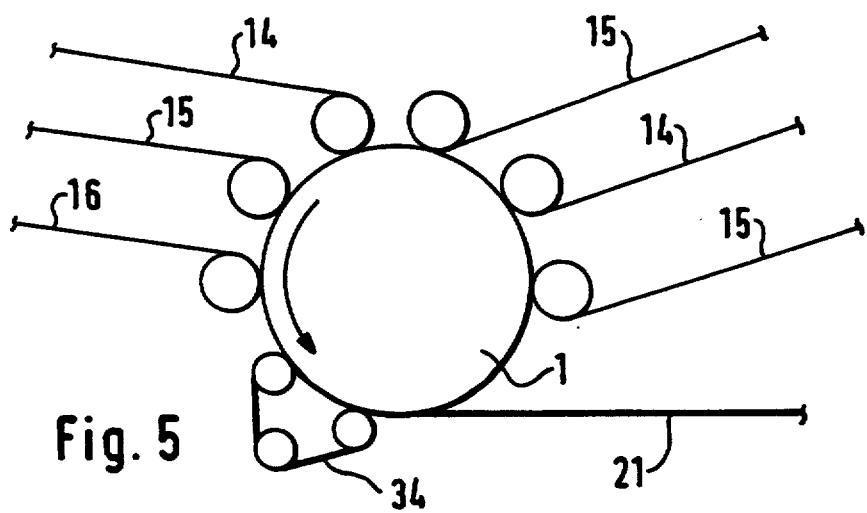
FIG. 5 shows a fifth embodiment of the apparatus, with an embossing belt for texturing the surfaces of the film composite.

The fifth embodiment of the apparatus, as shown diagrammatically in FIG. 5 includes, as an additional unit, an embossing belt 34, circulating endlessly over rolls and being adjacent to part of the circumferential surface of roll 1. With the aid of this, for example metallic, embossing belt 34, it is possible to texture just the underside of film composite 21, while the upper side remains untextured. The other individual parts of this apparatus for feeding the individual plastic film webs are the same as in the case of the embodiments of the apparatus according to FIGS. 1 to 4 and are therefore not described again. The embossing of the underside with the aid of embossing belt 34 takes place before film composite 21 is detached from roller 1. Thus, in one preferred embodiment, on the outer side of film composite 21 an embossing belt 34 endlessly revolving about rolls is adjacent to a section of the circumferential surface of heatable roller 1 for embossing the outer side of film composite 21 prior to detachment of the latter from heatable roller 1. Once film composite 21 has been detached from heatable roller 1, a cooling treatment can also be performed in a corresponding cooling arrangement, which is not shown.

Figure 6A:
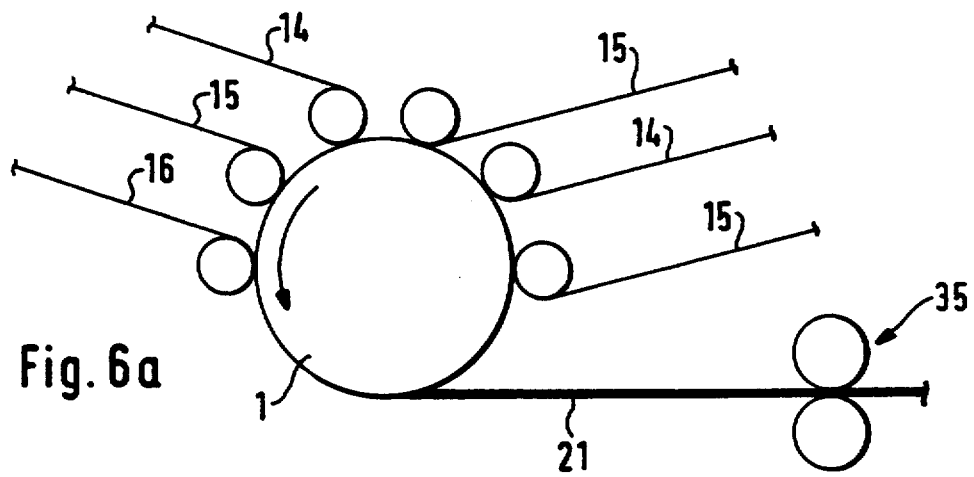
FIG. 6a shows a sixth embodiment of the apparatus, with an embossing station, between the rolls of which the film composite runs through and is embossed.

In the case of the sixth embodiment of the apparatus according to the invention, shown in FIG. 6a for embossing film composite 21 on both sides there is arranged downstream of heatable roller 1, seen in the running direction of film composite 21, an embossing station 35, which comprises two embossing rolls. After leaving heatable roller 1, film composite 21 runs through the nip between the two embossing rolls of the embossing station 35, in the way shown, so that the upper side and underside of film composite 21 experience a corresponding texturing.

Figure 6B:
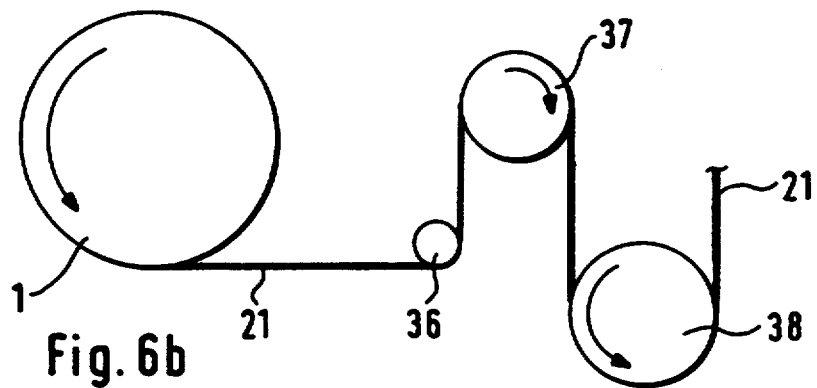
FIG. 6b shows an embossing station which is slightly modified in comparison with the embodiment according to FIG. 6a, in which the film composite is guided over guide rolls and is embossed by the latter.

Another possibility for texturing the surface of film composite 21 arises with the apparatus represented in FIG. 6b. For this purpose, after detachment from heatable roller 1, film composite 21 is drawn with high tension over a deflecting roll 36 and in a meandering form (or winding manner; or winding path) over temperature-controllable meandering rolls 37 and 38, which are offset with respect to each other in the vertical direction and which are arranged downstream of heatable roller 1. The surfaces of rolls 37 and 38 are either highly polished or textured. Due to the high tension which is exerted on film composite 21 by the appropriate driving speed of rolls 37 and 38, an appropriate texturing of the two sides of film composite 21 occurs.

Figure 7:
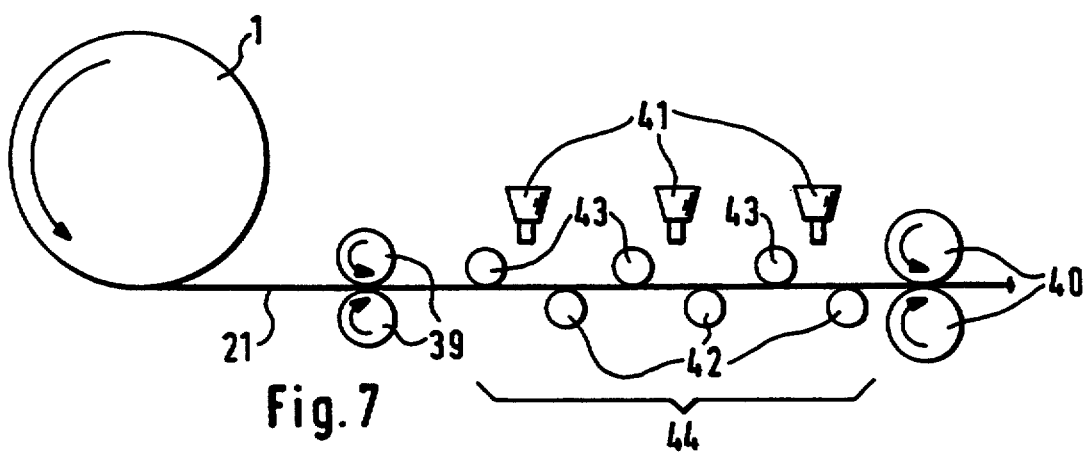
FIG. 7 shows a seventh embodiment of the apparatus, in which the film composite runs in flat position through a cooling arrangement.

In FIG. 7, a cooling arrangement or cooling zone 44 is shown, which is arranged downstream of roller 1. There may be such a cooling arrangement 44 in the case of all the embodiments that are shown in the previous FIGS. 1 to 6b. Cooling arrangement 44 comprises a number of fans or air nozzles 41, to which cooling air is admitted and which are fitted above film composite 21, which is transported in a flat position. Furthermore, cooling arrangement 44 comprises lower cooling rolls 42, over which film composite 21 is transported, and upper cooling rolls 43, which are in contact with the upper side of film composite 21. Cooling rolls 42 and 43 are offset with respect to one another, so that they are in contact alternately with the upper side and underside of film composite 21.

The operating principle of the individual embodiments of the invention is described in more detail below. The individual plastic film webs 14 to 16 are wound up on supply rolls 18, 19, and 20 and are fed via guide rolls 17 to the circumferential surface of roller 1. The biaxially stretched plastic web 14 shown at the right lower edge of FIG. 1 is to constitute the base layer of the film composite and is transported along a great portion of the periphery of roller 1. This film web 14 has, for example, a sealing layer only on its side facing away from roll 1, which layer is incipiently melted by roller 1 or by the compression roll 7, respectively and, if necessary, additionally by the heating device 8. At a certain distance from the entry point of the plastic film web 14 onto roller 1 there is the entry point for monoaxially stretched plastic film web 15, which is likewise heated. This plastic film web 15 may either be without a sealed layer or provided with a sealing layer and is sealed onto plastic film web 14 under pressure application by compression roll 6. The next entry point for a further plastic film web 14 onto the circumferential surface of roller 1 is located the same distance away from the compression roll 6 as there is between compression rolls 7 and 6. This further plastic film web 14 is likewise heat-treated by a heating device 10 and is laminated by the pressure exerted by compression roll 5 onto the two already sealed-together plastic film webs 14 and 15. In the same way, an unstretched plastic film web 16, a monoaxially stretched plastic film web 15, and a biaxially stretched film web 14 are then also sealed onto the already sealed-together plastic film webs under pressure and heat application to form the final film composite 21.

By this manner of proceeding, for example a film composite can be built up from up to twenty individual films of polypropylene, it being possible for the individual films to be biaxially and/or monoaxially stretched and/or unstretched, thermoplastic, and/or provided on one or both sides with sealing layers. Hence, in one preferred embodiment, alternately layered monoaxially and/or biaxially stretched and unstretched monofilm webs of the same polymer material are sealed together.

Furthermore, the individual films may be impression-pretreated or not pretreated. By means of the heating devices 8 to 13 in the form of infrared radiators, the mechanical properties of the starting films can be influenced, for example, by subjecting oriented films to a shrink treatment, and thus the properties of the film composite can be determined in accordance with the particular requirements. The process can be used to seal like or unlike plastic film webs together. This applies both to finished and to non-finished starting films. Metal foils on their own or in combination with plastic films, paper webs, or other materials which do not consist of plastic may similarly be used as starting films. During the application of heat it must be ensured that the sealing temperature is kept below the melting temperature of the individual plastic film webs, the unstretched film webs generally having a lower melting temperature than the stretched film webs.

By heating each plastic film web before it is conveyed over roller 1, the sealing layers of the plastic film webs are incipiently melted. Depending on the sealing raw material, the sealing temperature required lies between 90° and 140° C. Since the sealing temperature is always kept below the melting temperature of polypropylene, the orientations present in the individual plastic film webs due to stretching are retained even after sealing. Thus, in one preferred embodiment, each plastic film web is additionally heated before entry on to the heated curved surface of heatable roller 1, in order to incipiently melt the sealing layers of the plastic film webs and/or to influence the mechanical properties of the individual film web.

After leaving roller 1, according to FIG. 1, film composite 21 is guided over guide rolls (not shown) and wound up, in order to be ready for further processing.

In the case of the embodiments of the apparatus shown in FIGS. 2 to 7, after leaving the circumferential surface of roller 1, film composite 21 is subjected to additional process steps, such as for example blown with cooling air from fan 22 in FIG. 2 and cooled by contact with temperature-controllable cooling roll 23 and/or cooled twin-belt press 25. Instead of the fan 22, an air nozzle may also be used, through which cooling air is blown onto the upper side of film composite 21. Preferably, after leaving the curved surface of a heatable roller 1, film composite 21 is cooled by blowing with cooling air, and/or by contact with cooling rolls, and/or with a temperature-controllable twin-belt press. The cooling of film composite 21 has the effect of improving its flat position.

By incorporating the additional units shown in FIG. 3 into the apparatus according to this invention, film composite 21 can be stretched by means of temperature-controllable roll 28 and driven, temperature-controllable roll 29, in order to suppress any tendency of the film composite to curling. Hence, in one preferred embodiment, after leaving the curved surface of heatable roller 1, film composite 21 is guided over an arrangement of driven rolls having different diameters, and these rolls exert a tensile stress on film composite 21 which is thereby stretched in order to eliminate its tendency to curling.

Further process measures for treatment of film composite 21 include embossing the film composite on one or both sides, it being possible to carry out different embossing measures. These embossing process steps are carried out with the additional equipment according to FIGS. 4 to 6b. In one preferred embodiment, film composite 21 is embossed on one or both sides after leaving the curved surface of heatable roller 1.

Single-sided embossing of the underside of the film composite 21 takes place with the endlessly circulating embossing belt 34 of metal illustrated in FIG. 5. Embossing of film composite 21 on both sides is performed in embossing station 35, which comprises two embossing rolls, through the nip of which film composite 21 runs, as shown in FIG. 6a.

Similarly, embossing of film composite 21 on both sides can be carried out with the aid of the two embossing foils 31 and 33, as is represented in FIG. 4. These two embossing foils are guided over two sections of the circumferential surface of roll 1 of different lengths, such that film composite 21 is sandwiched between them. By applying an appropriate pressure onto the embossing foils and the film composite embedded between them, the underside and the upper side of film composite 21 are textured according to the patterns of the embossing foils.

Another process measure for texturing film composite 21 in the case of the apparatus according to FIG. 6b is to guide the film composite in a meandering manner over drivable and temperature-controllable rolls 37, 38 and to exert a variable tension on film composite 21 by the controllable rotational speed of these rolls, as a result of which a texturing of the surfaces of the film composite likewise occurs. Another possibility of texturing the composite on one or both sides is to design roll(s) 37 and/or 38 as embossing rolls.

If a particularly good flat positioning of film composite 21 is desired, the composite is guided horizontally and thereby subjected to intense cooling, by means of an appliance as depicted in FIG. 7, which combines temperature-controllable cooling rollers and fans or air nozzles, through which cold air is blown onto the surface of the composite film.

In accordance with another aspect of the invention, starting material for film composite 21 may include, in addition to the plastic film webs 14–16, webs of materials other than plastic and composites of such webs with plastic films which are continuously sealed with the plastic film ends.

In accordance with the invention, the treatment steps of heating, cooling, and embossing film composite 21 may be performed in all possible combinations after it leaves the sealing zone.

The film composites may be used as starting material for the production of multilayered thick films or boards by sealing together such film composites instead of the individual plastic film webs, employing the process steps described above.

Hence, in one preferred embodiment, the invention includes a process for producing a multilayered thick film or board from film composites in which instead of individual plastic film webs the starting materials, which are sealed together, are multi-layered film composites produced in accordance with the invention as described above.

It is to be understood that changes and modifications can be made without departing from the true scope and spirit of the invention. The true scope and spirit of the invention are defined by the following claims and their equivalents, to be interpreted in light of the foregoing specification.

What is claimed is:

1. A process for producing a multilayered thick film from multilayered film composites, comprising the steps of:
   producing a plurality of multilayered film composites from thermoplastic, coextruded plastic film webs, which are provided on at least one side with a sealing layer, by sealing under pressure and heat application, each multilayered film composite being produced by a process comprising the steps of:
   building up the film composite by continuous, additive sealing of individual moving plastic film webs onto a moving first plastic film web up to a given final thickness, the plastic film webs being fed separately and at a distance from one another to a heatable, curved surface and guided along this surface, and
   exerting pressure on each of the plastic film webs directly at its point of entry onto the curved surface;
   building up the multilayered thick film by continuous, additive sealing of individual moving thick film composites onto a moving first thick film composite up to a given final thickness, the thick film composites being fed separately and at a distance from one another to a heatable, curved surface and guided along this surface; and
   exerting pressure on each of the thick film composites directly at its point of entry onto the curved surface for sealing the thick film composites together.

2. A process for producing a multilayered film composite from thermoplastic, coextruded plastic film webs, which are provided on at least one side with a sealing layer, by sealing under heat and pressure application, comprising the steps of:
   providing at least one each of biaxially stretched, monoaxially stretched, and unstretched thermoplastic, coextruded plastic film webs;
   applying heat to each of the plastic film webs in a two step heating process, in a first step by heating each film web before entering onto a heated curved surface in order to influence the mechanical properties of the individual film webs and to incipiently melt the sealing layers of the plastic film webs before they are brought together, and in a second step by guiding each film web along said heated curved surface;
   building up the multilayered film composite by continuous, additive sealing of individual moving plastic film webs onto a first plastic film web moved along said heated curved surface, up to a given final thickness, whereby said plastic film webs are fed separately and at a distance from each other to said heated curved surface, the plastic film webs being bonded together, whereby a sealing temperature is kept below a melting temperature of the individual plastic film webs; and
   exerting pressure on each of the plastic film webs directly on its point of entry onto the curved surface.

3. The process as claimed in claim 2, wherein the plastic film webs are passed over and compressed together by means of compression rolls.

4. The process as claimed in claim 2, wherein unlike plastic film webs are sealed together.

5. The process as claimed in claim 2, including alternately layering stretched and unstretched monofilm webs of the same polymer material and sealing the layered webs together, the unstretched film webs having a lower melting temperature than the stretched film webs.

6. The process as claimed in claim 5, further comprising the step of guiding the film composite, after leaving the curved surface, over an arrangement of driven rolls having different diameters, for exerting a tensile stress on the film composite which is thereby stretched in order to eliminate its tendency to curling.

7. The process as claimed in claim 2, further comprising the step of cooling the film composite, after leaving the curved surface, by at least one of blowing with cooling air, by contact with cooling rolls, and contact with a temperature-controllable twin-belt press.

8. The process as claimed in claim 2, further comprising the step of embossing the film composite on at least one side after leaving the curved surface.

9. The process as claimed in claim 2, including providing, as starting material for the film composite, in addition to the plastic film webs, webs of materials other than plastic and composites of such webs with plastic films, and continuously sealing the composite webs with the plastic film webs.

10. The process as claimed in claim 2, further comprising the treatment steps of heating, cooling, and embossing the film composite, performed in any possible combination after the film composite leaves a sealing zone.

* * * * *